United States Patent
Gertitschke et al.

(10) Patent No.: US 9,422,074 B2
(45) Date of Patent: Aug. 23, 2016

(54) SEALING ROLL

(71) Applicant: Uhlmann Pac-Systeme GmbH & Co. KG, Laupheim (DE)

(72) Inventors: Detlev Gertitschke, Laupheim (DE); Robert Lehmann, Gundelfingen (DE); Juergen Liebhardt, Laupheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 631 days.

(21) Appl. No.: 13/895,843

(22) Filed: May 16, 2013

(65) Prior Publication Data

US 2013/0306625 A1     Nov. 21, 2013

(30) Foreign Application Priority Data

May 16, 2012   (EP) .................................... 12168220

(51) Int. Cl.
| | | |
|---|---|---|
| *B65B 51/16* | (2006.01) | |
| *B29C 33/06* | (2006.01) | |
| *B29C 51/22* | (2006.01) | |
| *B29C 51/42* | (2006.01) | |

(52) U.S. Cl.
CPC ............... *B65B 51/16* (2013.01); *B29C 33/065* (2013.01); *B29C 51/22* (2013.01); *B29C 51/42* (2013.01)

(58) Field of Classification Search
CPC ...... B29C 33/065; B29C 51/22; B29C 51/42; B65B 51/16
USPC ............ 219/469, 471, 602, 619; 156/64, 145, 156/209, 471, 555; 399/328, 330, 333
See application file for complete search history.

(56) References Cited

U.S. PATENT DOCUMENTS

| | | | |
|---|---|---|---|
| 2,273,423 A | 2/1942 | Somes | |
| 2,912,556 A | 11/1959 | Hold | |
| 4,499,355 A * | 2/1985 | Walter | H05B 6/02 132/229 |
| 4,657,625 A | 4/1987 | Kawakami | |
| 6,195,525 B1 * | 2/2001 | Maeyama | G03G 15/2039 219/216 |
| 6,373,035 B1 * | 4/2002 | Okamoto | D21F 5/024 219/469 |
| 6,399,949 B1 * | 6/2002 | Roney, Jr. | G01N 21/952 250/341.6 |
| 6,438,335 B1 * | 8/2002 | Kinouchi | G03G 15/2039 219/619 |
| 6,704,537 B2 * | 3/2004 | Takeuchi | G03G 15/2053 219/216 |

FOREIGN PATENT DOCUMENTS

| | | |
|---|---|---|
| DE | 3416353 A1 | 11/1985 |
| EP | 2213577 A2 | 8/2010 |
| JP | 57149616 A | 9/1982 |
| JP | 2010015695 A | 1/2010 |
| JP | 2011218732 | 11/2011 |

OTHER PUBLICATIONS

European Search Report for priority application EP 12168220 dated Dec. 6, 2012.

* cited by examiner

*Primary Examiner* — Thien S Tran
(74) *Attorney, Agent, or Firm* — Brinks Gilson & Lione

(57) ABSTRACT

The sealing roll includes a stationary internal shaft and an inductively heatable roll jacket supported with freedom to rotate around the shaft. A plurality of induction coils is wound around the shaft over ferrites, which are open to the outside. Cables for the induction coils are laid through a cable conduit in the shaft for connection to an external induction generator. A water cooling channel for indirectly cooling the induction coils is also arranged in the shaft. A cavity is formed in at least an axial subsection of the sealing roll between the roll jacket and the shaft, and at least part of a temperature detection device is arranged in the cavity or adjacent to the cavity so that an IR temperature sensor receives radiation emitted by the roll jacket and thus detects a temperature of the roll jacket.

11 Claims, 3 Drawing Sheets ial Applications

SEALING ROLL

RELATED APPLICATIONS

The present patent document claims the benefit of priority to European Patent Application No. EP 12168220.5, filed May 16, 2012, the entire contents of each of which are incorporated herein by reference.

FIELD AND BACKGROUND OF THE INVENTION

The present invention relates to a heatable sealing roll.

Heatable sealing rolls are used, for example, for the continuous sealing of blister packs for small pharmaceutical products. To protect the sensitive pharmaceutical products, the blister packs must be tightly sealed, for which reason very high requirements are imposed on the sealing process. It is standard practice to use heat and pressure to seal an aluminum lidding sheet coated with a heat-seal lacquer tightly to a PVC bottom sheet, the blister pockets of which hold the pharmaceutical products. There are many different ways in which the heatable sealing roll can be designed.

A typical design uses tubular heating cartridges introduced into the sealing roll. The disadvantages of this type of design, in which the measurement signals and feed voltage for the heating cartridges are transmitted via slip rings, are to be found first of all in the corrosion of the slip rings by PVC gases and in the wear to which they are subject, which can lead to uncontrolled interruptions in the measurement signals and thus in the heating of the sealing roll. In addition, the use of resistance heaters requires a large thermal mass to achieve a uniform temperature distribution. The automatic temperature control therefore operates slowly. Finally, heating cartridges are wear parts, which must be replaced after a certain number of operating hours. Because gap corrosion occurs as a result of the continuous heating and cooling, it is often not possible to replace the cartridges easily without destroying them in the process.

SUMMARY OF THE INVENTION

It is an object of the present invention to provide a sealing roll which requires only a modest amount of maintenance and which guarantees reliable operation and a uniform temperature distribution even under continuous operating conditions.

According to an aspect of the invention, the sealing roll comprises a rigid internal shaft and an induction-heated roll jacket supported with freedom to rotate around the shaft. A plurality of induction coils is wound around the shaft over ferrites, which are open radially toward the outside, wherein the cables for the induction coils are laid through a cable conduit in the shaft for connection to an external induction generator. In addition, at least one water cooling channel is provided in the shaft, which serves to cool the induction coils indirectly. To monitor the temperature of the roll jacket and thus to monitor the function of the sealing roll, a cavity is formed in at least an axial subsection of the sealing roll between the heating jacket and the shaft. A temperature detection device for detecting the temperature of the roll jacket is arranged in this cavity or adjacent to it so that an IR temperature sensor, which forms part of the temperature detection device, receives radiation emitted by the roll jacket and thus detects a temperature of the roll jacket.

With this design it is possible to heat the sealing jacket over long periods in a uniform manner, wherein at the same time the service life of the individual components is very long and the superior operation of the sealing roll remains guaranteed even under continuous operating conditions.

The roll jacket preferably comprises a radially outward situated sealing jacket and, connected to it, an internal heat distribution element made of a material with good thermal conductivity. This has the effect of improving the performance of the sealing roll even more.

Because the sealing jacket is a wear part, it is advantageous for the sealing jacket and the heat distribution element to lie detachably against each other.

To support the inductive heating of the heat distribution element, thin tubular elements of ferrite are preferably set into the heat distribution element.

It is advantageous overall for the water cooling channel to define a circulation loop. The water cooling channel is preferably formed in a bore in the shaft.

It is especially preferred that a tube with an outside diameter smaller than the diameter of the bore be arranged in the bore, and for the water cooling channel thus to comprise a cooling water feed channel and a cooling water return channel, which are connected to each other at one end of the tube. In this way the water is able to cool the induction coils in an especially effective manner.

The ferrites are preferably designed as U-ferrites or as W-ferrites. The side legs of these ferrite forms thus cause the magnetic field produced by the induction coils to extend radially outward, and the magnetic field lines are concentrated in the direction toward the heat distribution element.

To prevent an undesirable overheating of the induction coils, a temperature switch is preferably provided on the surface of each induction coil.

The cables for the temperature switches are preferably laid through the cable conduit in the shaft so that they can be connected to the external induction generator. In this way, a coil can be easily replaced if it should fail.

The IR temperature sensor is usually arranged directly in the area of the cavity or directly adjacent to it, preferably in a measuring channel of the shaft which has an opening towards the cavity. However, the temperature detection device may also comprise a deflecting mirror arranged in the measuring channel of the shaft. The mirror then receives the radiation which is emitted by the roll jacket and is passing through the cavity and transmits it through the measuring channel to the outside, where the IR temperature sensor is arranged axially at the end of the shaft. In this way, the IR temperature sensor may be isolated from external influences and protected from excessive thermal load.

BRIEF DESCRIPTION OF THE DRAWINGS

Additional advantages and features of the present invention can be derived from the following description, which refers to the drawings.

DETAILED DESCRIPTION OF SPECIFIC EMBODIMENTS

Figure 1:
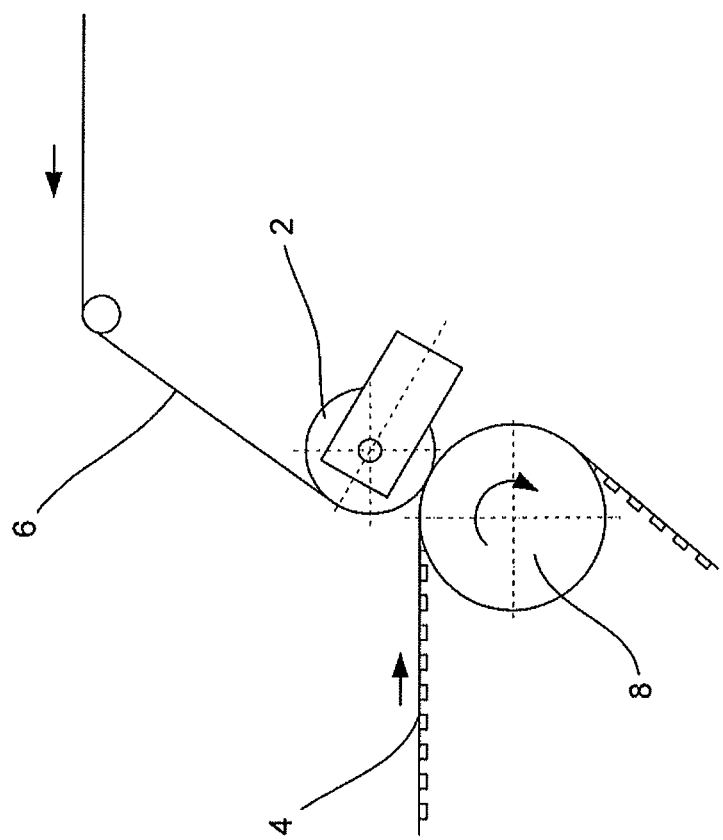
FIG. 1 is a schematic view of a typical installation situation of a sealing roll according to the invention in a sealing station for blister packs.

FIG. 1 shows a sealing station for blister packs in which the sealing roll 2 according to the invention would normally be used. In a sealing station like this, a bottom sheet 4 (usually made of PVC) provided with filled pockets and a lidding sheet 6 (usually of aluminum) are sealed together under pressure between a feed roll 8 and a sealing roll 2. The sealing roll 2 is also heated during this process to ensure a uniform seal.

Figure 2:
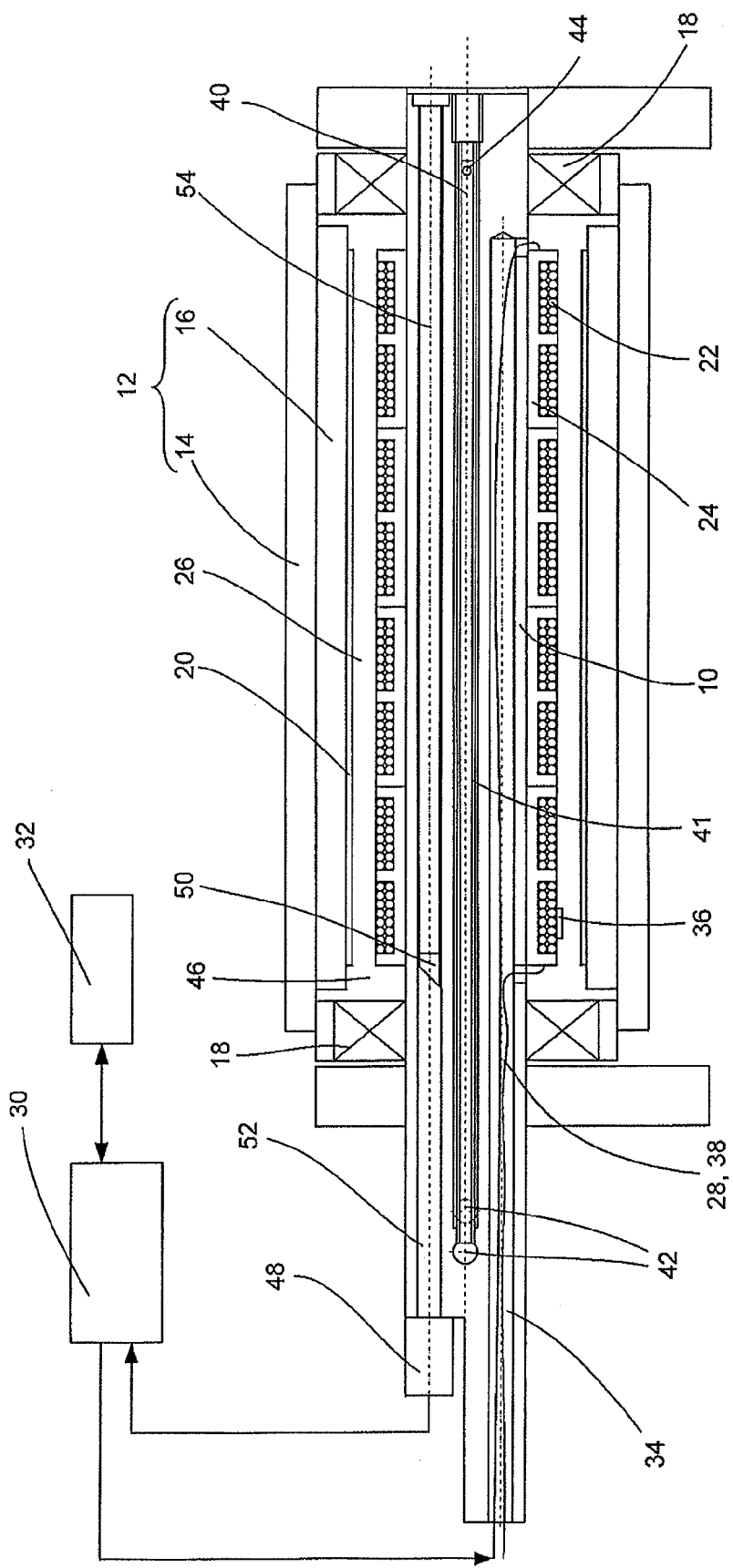
FIG. 2 shows a longitudinal cross section through one embodiment of the sealing roll according to the invention.
Figure 3:
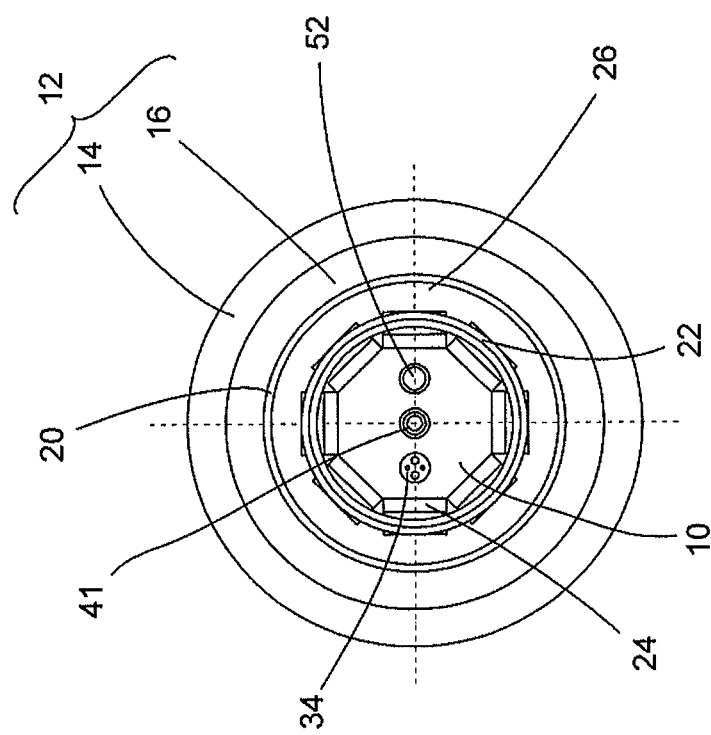
FIG. 3 shows a transverse cross section through the embodiment of the sealing roll of FIG. 2.

As shown in FIGS. 2 and 3, the sealing roll 2 according to the invention comprises a stationary internal shaft 10. The material of the shaft 10 is usually high-grade steel. The sealing roll 2 also comprises a roll jacket 12, supported so that it can rotate around the shaft 10.

The roll jacket 12 comprises a radially outward-situated sealing jacket 14, which is preferably designed as a hollow cylinder. The material of the sealing jacket 14 is usually ferritic steel. The roll jacket 12 can, in one embodiment (not shown), consist only of the sealing jacket 14, because this is already ferritic and thus can be heated by induction.

The roll jacket 12 preferably also comprises, however, a heat distribution element 16, situated inside of and connected to the sealing jacket 14. The heat distribution element 16 is also preferably designed as a hollow cylinder and lies directly against the sealing jacket 14 to ensure good heat transfer. It is especially preferred for the connection between the sealing jacket 14 and the heat distribution element 16 to be detachable, because then it is easy to replace the sealing jacket 14, which is a wear part. With respect to the connection between the sealing jacket 14 and the heat distribution element 16, the property is exploited that steel has a smaller coefficient of thermal expansion than aluminum or copper. In this way, the sealing jacket 14 and the heat distribution element 16, which can be slid back and forth over each other at room temperature and thus separated from each other, are clamped tightly together when the sealing roll 2 is hot.

The roll jacket 12 is preferably supported rotatably on the shaft by means of conventional bearings 18. In this area, the shaft 10 is cylindrical in form.

The material of the heat distribution element 16 with good thermal conductivity is preferably aluminum or copper. Thin ferritic tubular elements 20, which transfer the heat to the heat distribution element 16, are mounted on the inside surface of the heat distribution element 16.

The sealing roll 2 also comprises a plurality of induction coils 22, which are arranged around the shaft 10. The induction coils 22 are for this purpose wound around the shaft 10 over ferrites 24, which are open in the radial direction. The ferrites 24 can be connected to the shaft 10 by means of, for example, a thermally conductive paste. It is also possible to provide a permanent connection between these components, which must in any case have good thermal conductivity.

As can be derived from FIG. 3, the shaft 10 is provided in the area of the ferrites 24 with a polygonal outline, so that U-shaped or W-shaped ferrites with a flat base can be used as the ferrites 24. In the example shown here (see FIG. 2), the ferrites 24 are designed as W-ferrites, the legs of which point radially outward.

As can be seen in FIG. 3, the induction coils 22 are arranged concentrically around the shaft 10. An air-filled intermediate space 26 is provided between the induction coils 22 and the roll jacket 12.

The induction coils 22 are connected to an induction generator 30, arranged outside the sealing roll 2, by cables 28. The induction generator 30 receives the target values for production by the machine from an automatic control unit 32 and controls the induction coils 22 accordingly. The most important target value is the desired temperature of the sealing roll 2, which depends on the machine output and on the combination of sheets being used.

The cables 28 for the induction coils 22 are laid through an axial cable conduit 34 in the shaft 10. The cable conduit 34 can have a tubular form.

Finally, a temperature switch 36 is arranged on the surface of each induction coil 22. This switch is connected to the external induction generator 30 by additional cables 38, which are also laid through the cable conduit 34 in the shaft 10.

The temperature switches 36 are designed as bimetal switches, which interrupt the voltage of the induction generator 30 by way of a contactor when the switching threshold is reached, so that the induction generator 30 cannot switch itself back on independently.

During operation, the temperature of the sealing roll 2 can be has high as 260° C. at the sealing jacket 14. The sealing roll 2 therefore comprises at least one water cooling channel 40, which is arranged in the shaft 10 and serves to indirectly cool the induction coils 22 wound around the shaft 10 and the ferrites 24. In the example shown here, the water cooling channel 40 also extends in the axial direction through the shaft 10.

The water cooling channel 40 should preferably define a circulation loop. In the preferred embodiment shown here, the water cooling channel 40 is formed in a bore in the shaft 10. A tube 41 can be inserted into the bore in the shaft 10, the outside diameter of which is smaller than the diameter of the bore. Thus the water cooling channel 40 comprises an inner water cooling feed channel and a cooling water return channel located radially farther toward the outside. This arrangement could also be reversed. The water cooling feed channel and the cooling water return channel are preferably connected to each other at one end of the tube 41. FIG. 3 shows the two channels of the water cooling channel 40. In FIG. 2 we can see the feed and outlet openings 42 of the water cooling channel 40 for the external water connection and the through-opening 44 at the other end of the tube 41 for connection of the feed channel to the return channel. Of course, many other designs and geometries of the water cooling channel 40 in the shaft 10 are conceivable.

In an axial subsection of the sealing roll 2, a cavity 46 is formed between the roll jacket 12, here more precisely the heat distribution element 16, and the shaft 10. The temperature detection device for detecting the temperature of the roll jacket 12 is arranged in this cavity or adjacent to it. This cavity 46, which extends in the radial direction, preferably communicates with the previously described intermediate space 26 between the induction coils 22 and the roll jacket 12.

Radiation emitted by the heat distribution element 16 passes through this cavity 46 and is ultimately detected by the IR temperature sensor 48 and evaluated, which means that it is possible to measure the temperature of the roll jacket 12. The IR temperature sensor 48 in the example shown here is mounted axially on the end of the shaft 10. To conduct the radiation to the remotely installed IR temperature sensor 48, the temperature detection device in this embodiment therefore comprises not only the IR temperature sensor 48 but also a deflecting mirror 50, which is arranged in an axially oriented measuring channel 52 in the shaft 10. In the area between the deflecting mirror 50 and the IR temperature sensor 48, the measuring channel 52 is preferably filled with air. The deflecting mirror 50 can be mounted on a rod 54, which, in the example of FIG. 2, can be pulled out of the shaft 10 toward the right for servicing.

Alternatively, the IR temperature sensor 48 can also be arranged directly in the cavity 46 or directly adjacent to the cavity 46, preferably in the measuring channel 52 in the shaft 10 which has an opening towards the cavity 46.

The invention claimed is:

1. A sealing roll comprising:
a stationary internal shaft;
an inductively heatable roll jacket, supported with freedom to rotate around the shaft;
a plurality of induction coils, which are wound around the shaft over ferrites which are open to the outside;
a cable conduit in the shaft receiving cables for the induction coils, the cables guided through the cable conduit to connect the inductions coils to an external induction generator;
at least one water cooling channel arranged in the shaft and serving to indirectly cool the induction coils;
a cavity formed in at least an axial subsection of the sealing roll between the roll jacket and the shaft; and
a temperature detection device comprising an IR temperature sensor, at least part of the temperature detection device arranged in the cavity or adjacent to the cavity so that the IR temperature sensor receives radiation emitted by the roll jacket and thus detects a temperature of the roll jacket, the temperature detection device further comprising a deflecting mirror arranged in a measuring channel in the shaft, which deflecting mirror receives radiation emitted by the roll jacket and passing through the cavity and conducts it through the measuring channel to the outside, and wherein the IR temperature sensor is arranged axially at an end of the shaft.

2. The sealing roll of claim 1 wherein the roll jacket comprises a radially outward-situated sealing jacket and a radially inward-situated heat distribution element connected to the sealing jacket, the heat distribution element made of a material having a good thermal conductivity.

3. The sealing roll according to claim 2 wherein the sealing jacket and the heat distribution element lie detachably against each other.

4. The sealing roll of claim 2 wherein thin ferritic tubular elements are set into the heat distribution element.

5. The sealing roll of claim 1 wherein the water cooling channel defines a circulation loop.

6. The sealing roll of claim 1 wherein the water cooling channel is formed in a bore in the shaft.

7. The sealing roll of claim 6 wherein a tube is arranged in the bore in the shaft, an outside diameter of the tube being smaller than a diameter of the bore, the water cooling channel thus comprising a cooling water feed channel and a cooling water return channel, which are connected to each other at one end of the tube.

8. The sealing roll of claim 1 wherein the ferrites are designed as U-ferrites or W-ferrites.

9. The sealing roll of claim 1 wherein a temperature switch is arranged on a surface of each induction coil.

10. The sealing roll of claim 9 wherein cables for the temperature switches are received in the cable conduit in the shaft for connection to the external induction generator.

11. The sealing roll of claim 1 wherein the temperature sensor is arranged in a measuring channel in the shaft adjacent to the cavity to receive radiation emitted by the roll jacket and passing through the cavity.

* * * * *